US012583290B2

(12) United States Patent
Lim et al.

(10) Patent No.: US 12,583,290 B2
(45) Date of Patent: Mar. 24, 2026

(54) 3-WAY VALVE AND HEAT PUMP SYSTEM USING SAME

(71) Applicant: Hanon Systems, Daejeon (KR)

(72) Inventors: Ju Young Lim, Daejeon (KR); Gun Ryang Kim, Daejeon (KR); Dong Won Lee, Daejeon (KR); Hun Sang Lee, Daejeon (KR)

(73) Assignee: HANON SYSTEMS, Daejeon (KR)

( * ) Notice: Subject to any disclaimer, the term of this patent is extended or adjusted under 35 U.S.C. 154(b) by 0 days.

(21) Appl. No.: 18/564,225

(22) PCT Filed: Dec. 7, 2022

(86) PCT No.: PCT/KR2022/019803
§ 371 (c)(1),
(2) Date: Nov. 27, 2023

(87) PCT Pub. No.: WO2023/128365
PCT Pub. Date: Jul. 6, 2023

(65) Prior Publication Data
US 2024/0246394 A1 Jul. 25, 2024

(30) Foreign Application Priority Data
Dec. 31, 2021 (KR) ........................ 10-2021-0193637

(51) Int. Cl.
*B60H 1/32* (2006.01)
*B60H 1/00* (2006.01)
*F25B 41/20* (2021.01)

(52) U.S. Cl.
CPC ....... *B60H 1/3205* (2013.01); *B60H 1/00485* (2013.01); *B60H 1/00785* (2013.01); *F25B 41/20* (2021.01); *F25B 2600/2515* (2013.01)

(58) Field of Classification Search
CPC .. F25B 41/20; F25B 2600/2515; F25B 49/02; F25B 2600/2501; F25B 2313/02731;
(Continued)

(56) References Cited

U.S. PATENT DOCUMENTS

2007/0068584 A1* 3/2007 Murdock ............ F16K 11/0873
137/625.47

FOREIGN PATENT DOCUMENTS

CN 102230547 A 11/2011
CN 204555415 U * 8/2015
(Continued)

OTHER PUBLICATIONS

English translation of Official Action issued May 9, 2025 in related German Patent Application No. DE 112022003861.6 , 12 pgs.
(Continued)

*Primary Examiner* — Kun Kai Ma
(74) *Attorney, Agent, or Firm* — NORTON ROSE FULBRIGHT US LLP

(57) ABSTRACT

Embodiments provide a 3-way valve and a heat pump system using same, the 3-way valve comprising: a housing in which an inlet, a first outlet, and a second outlet are disposed; and a ball valve which is disposed inside the housing, wherein the ball valve comprises: an inlet hole which is connected to the inlet and into which a refrigerant flows; a first outlet hole and a second outlet hole, through which the refrigerant flowing into the inlet hole flows out, and when the ball valve rotates, the refrigerant flowing out through the first outlet hole passes through the first outlet, and the flow rate of the refrigerant flowing out through the second outlet hole is controlled through the second outlet.

12 Claims, 9 Drawing Sheets

(58) Field of Classification Search
CPC ...... F25B 2400/0403; F25B 2400/0409; F25B
41/39; B60H 1/00914; B60H 1/3207;
F16K 27/067; F16K 11/087; F16K 27/06
See application file for complete search history.

(56) References Cited

FOREIGN PATENT DOCUMENTS

| | | | |
|---|---|---|---|
| DE | 102018201942 | | 8/2019 |
| JP | H08233131 | A | 9/1996 |
| JP | 11248018 | | 9/1999 |
| JP | 3256186 | B | 2/2002 |
| JP | 2005310765 | A  * | 11/2005 |

OTHER PUBLICATIONS

English translation of Official Action issued May 21, 2025 in related
Korean Patent Application No. 10-2021-0193637, 15 pgs.

* cited by examiner

3-WAY VALVE AND HEAT PUMP SYSTEM USING SAME

CROSS REFERENCE TO RELATED APPLICATIONS

This patent application is a national phase under 35 U.S.C. § 371 of International Patent Application No. PCT/KR2022/019803 filed Dec. 7, 2022, which claims the benefit of priority from Korean Patent Application Nos. 10-2021-0193637 filed Dec. 31, 2021, each of which is hereby incorporated herein by reference in its entirety for all purposes.

TECHNICAL FIELD

Embodiments relate to a 3-way valve and a heat pump system using the same. More particularly, the embodiments relate to a 3-way valve utilizing a ball valve with a variable structure and a heat pump system using the same.

BACKGROUND ART

Under the development of environmentally friendly industries and the development of energy sources that replace fossil fuels, electric vehicles and hybrid vehicles are the most prominent areas in the automotive industry in recent years. These electric vehicles and hybrid vehicles are equipped with a battery to provide propulsion power, which is used not only for travel but also for heating and cooling.

In a vehicle that uses a battery to provide propulsion power, using the battery as a heat source for heating and cooling means that the mileage will be reduced by that amount; therefore, to overcome the above problem, a method has been proposed to apply a heat pump system, which is widely used as a heating and cooling device in homes, to the vehicle.

For reference, a heat pump refers to a device that absorbs heat from a lower temperature and transfers the absorbed heat to a higher temperature. The heat pump as an example has a cycle in which a liquid refrigerant is evaporated in an evaporator, absorbs heat from the surrounding environment, becomes gaseous, and is liquefied by a condenser, releasing the heat back to the environment. When it is applied to an electric or hybrid vehicle, it has the advantage of When it is applied to an electric or hybrid vehicle, it has the advantage of ensuring a heat source, which may be insufficient in conventional air conditioning situations FIG. 1 is a diagram illustrating a partial configuration of a conventional heat pump system 10 used in vehicles.

As shown in FIG. 1, in a heating and dehumidification mode of the conventional heat pump system, a refrigerant flows through a compressor 11, passes through an internal condenser 13 located within an air conditioning case 12, and then passes through an expansion valve 14; and subsequently, the refrigerant passing through the expansion valve 14 is branched into and moved to a water-cooled condenser 15 and/or an evaporator 16.

In the heating and dehumidification mode, the refrigerant that have passed through the internal condenser 13 is expanded by an expansion valve 14, and then moved to the evaporator 16 through a 2-way valve 17 to dehumidify the air.

However, the 2-way valve 17 has only a simple on/off function, which does not allow the amount of refrigerant to flow as needed, and also has a problem with the dehumidification performance due to the lack of the refrigerant.

DISCLOSURE

Technical Problem

The purpose of the embodiments is to improve the dehumidification performance of a 3-way valve by changing the structure of an internal ball valve in the 3-way valve to regulate the flow rate of the refrigerant.

Objectives to be solved by embodiments are not limited to the objectives described above, and objectives which are not described above will be clearly understood by those skilled in the art from the following descriptions.

Technical Solution

An embodiment of the present invention may be characterized in that it includes: a housing having an inlet, a first outlet, and a second outlet disposed therein; and a ball valve disposed within the housing, wherein the ball valve includes an inlet hole which is connected to the inlet and into which a refrigerant is introduced, and a first outlet hole and a second outlet hole through which the refrigerant introduced into the inlet hole flows out, when the ball valve is rotated, the refrigerant flowing out through the first outlet hole passes through the first outlet, and the refrigerant flowing out through the second outlet hole passes through the second outlet, and the flow rate of the refrigerant discharged from the first outlet and the second outlet is controlled depending on the position of the first outlet hole and the second outlet hole due to the rotation of the ball valve.

Preferably, the embodiment may be characterized in that the first outlet and the second outlet are disposed in the housing so as to be opposed each other.

Preferably, the embodiment may be characterized in that the centerline of the first outlet hole and the centerline of the second outlet hole are arranged to intersect each other.

Preferably, the embodiment may be characterized in that an area of the first outlet hole is formed to be larger than an area of the first outlet, and an area of the second outlet hole is formed to be equal to or smaller than an area of the second outlet.

Preferably, the embodiment may be characterized in that a ratio of a transverse diameter of the second outlet hole to a transverse width of the first outlet hole is less than or equal to 0.3.

Preferably, the embodiment may be characterized in that a ratio of a transverse width to a longitudinal height of the first outlet hole is greater than 2.

Preferably, the embodiment may be characterized in that a longitudinal height of the first outlet hole and a diameter of the inlet hole are the same.

Further, the other embodiment of the present invention may be characterized in that it includes: a compressor configured to compress and discharge a refrigerant; a first expansion means configured to expand an compressed refrigerant; a first moving line and a second moving line along which the refrigerant expanded by the expansion means moves; a condenser disposed on the first moving line; and an evaporator disposed within the air conditioning case and into which the refrigerant moving along the second moving line is introduced, wherein the 3-way valve in any one of claims 1 to 11 is disposed at a bifurcation of the first moving line and the second moving line. Specifically, the other embodiment may control the flow rate of the refrigerant discharged from the first outlet and the second outlet depending on the position of the first outlet hole and the second outlet hole due to the rotation of the ball valve.

Preferably, the other embodiment may be characterized in that the refrigerant which has passed through the compressor passes through an indoor heat exchanger disposed within the air conditioning case and is then introduced into the expansion means.

Preferably, the other embodiment may be characterized in that, in a heating and dehumidification mode, the 3-way valve is configured to control the amount of the refrigerant introduced into the evaporator according to humidity information sensed in a vehicle.

Advantageous Effects

According to the embodiments, there is an effect of improving dehumidification performance by regulating the amount of refrigerant as needed in a heating and dehumidification mode.

Various useful advantages and effects of the embodiments are not limited to the above-described contents and will be more easily understood from descriptions of the specific embodiments.

BRIEF DESCRIPTION OF THE DRAWINGS

FIG. 2 is a perspective view of a ball valve disposed inside a 3-way valve in accordance with one embodiment of the present invention;

FIGS. 6 through 9 are diagrams illustrating the operation of the 3-way valve shown in FIG. 2;

BEST MODE

Figure 1:
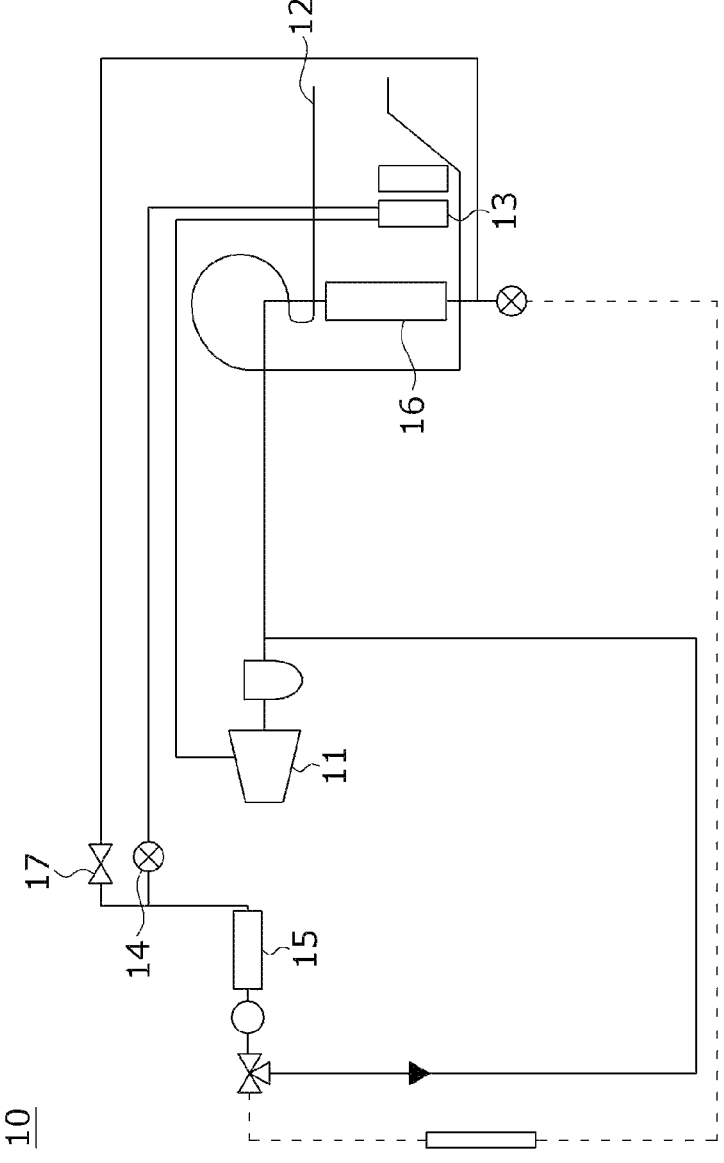
FIG. 1 is a diagram illustrating a partial construction of a conventional heat pump system 10 for use in vehicles.

Hereinafter, exemplary embodiments of the present invention will be described in detail with reference the accompanying drawings.

However, the technical spirit of the present invention is not limited to some embodiments which will be described and may be embodied in a variety of different forms, and at least one or more components of the embodiments may be selectively combined, substituted, and used within the range of the technical spirit.

In addition, unless clearly and specifically defined otherwise by the context, all terms (including technical and scientific terms) used herein can be interpreted as having meanings customarily understood by those skilled in the art, and meanings of generally used terms, such as those defined in commonly used dictionaries, will be interpreted in consideration of contextual meanings of the related art.

In addition, the terms used in the embodiments of the present invention are considered in a descriptive sense only and not to limit the present invention.

In the present specification, unless clearly indicated otherwise by the context, singular forms include the plural forms thereof, and in a case in which "at least one (or one or more) among A, B, and C" is described, this may include at least one combination among all possible combinations of A, B, and C.

In addition, in descriptions of components of the present invention, terms such as "first," "second," "A," "B," "(a)," and "(b)" can be used.

The terms are only to distinguish one element from another element, and the essence, order, and the like of the elements are not limited by the terms.

In addition, it should be understood that, when an element is referred to as being "connected" or "coupled" to another element, such a description may include both a case in which the element is directly connected or coupled to another element, and a case in which the element is connected or coupled to another element with still another element disposed therebetween.

In addition, when any one element is described as being formed or disposed "on" or "under" another element, such a description includes both a case in which the two elements are formed or disposed in direct contact with each other and a case in which one or more other elements are interposed between the two elements. In addition, when one element is described as being formed "on or under" another element, such a description may include a case in which the one element is formed at an upper side or a lower side with respect to another element.

Hereinafter, in the detailed description of the example embodiments of the invention with reference to the accompanying drawings, components that are the same or correspond to each other will be denoted by the same reference numerals in all of the figures, and redundant descriptions will be omitted.

FIGS. 2 to 10 clearly illustrate only main features for conceptually and clearly understanding the present invention. As a result, various modifications of the drawings are expected, and the scope of the present invention need not be limited to particular shapes illustrated in the drawings.

Figure 2:
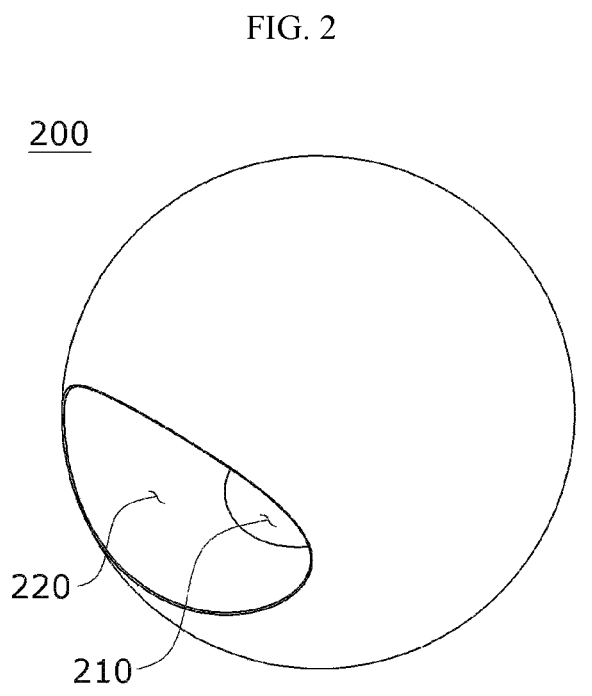
Figure 3:
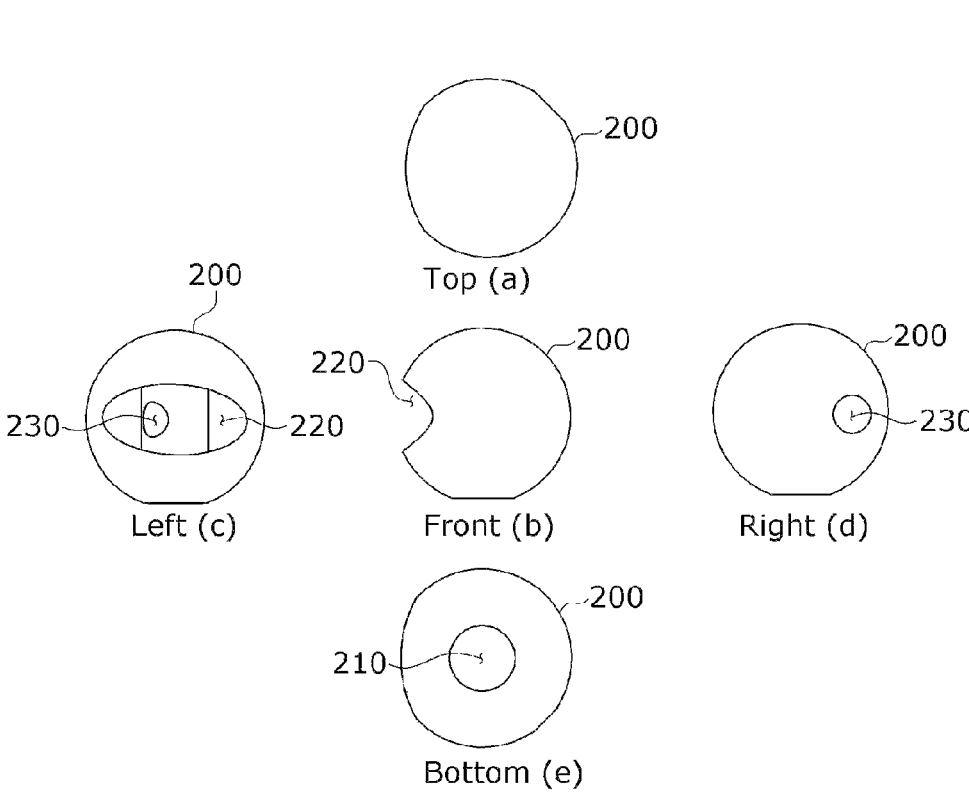
FIG. 3 are diagrams illustrating a shape of FIG. 2.
Figure 4:
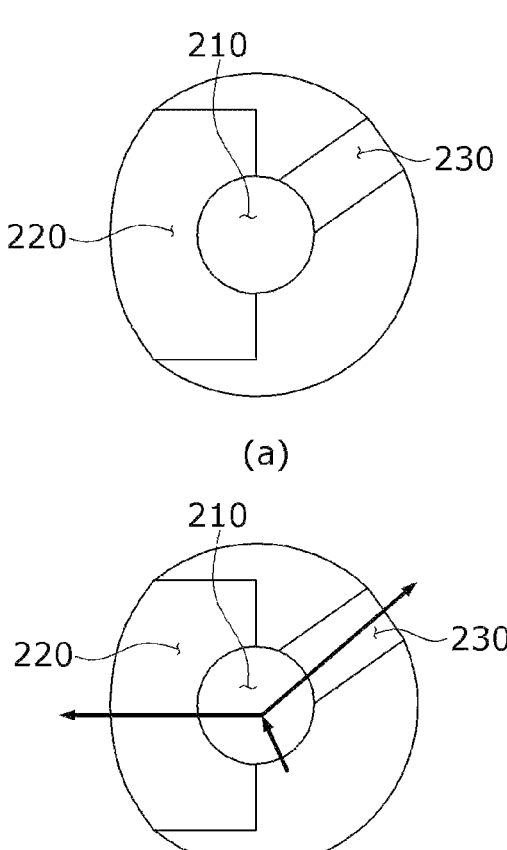
FIG. 4 is a cross-sectional view taken along the horizontal direction of FIG. 3.
Figure 5:
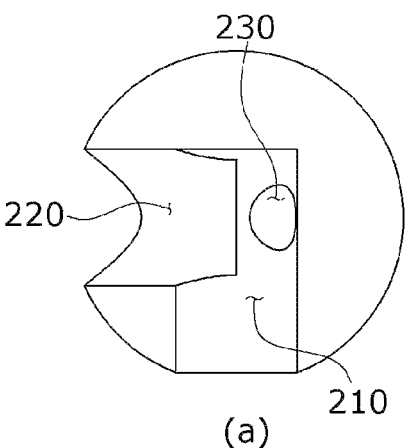
FIG. 5 is a cross-sectional view taken along the vertical direction of FIG. 3.
Figure 5:
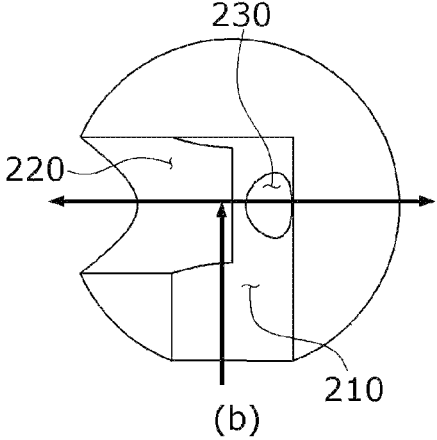
Figure 6:
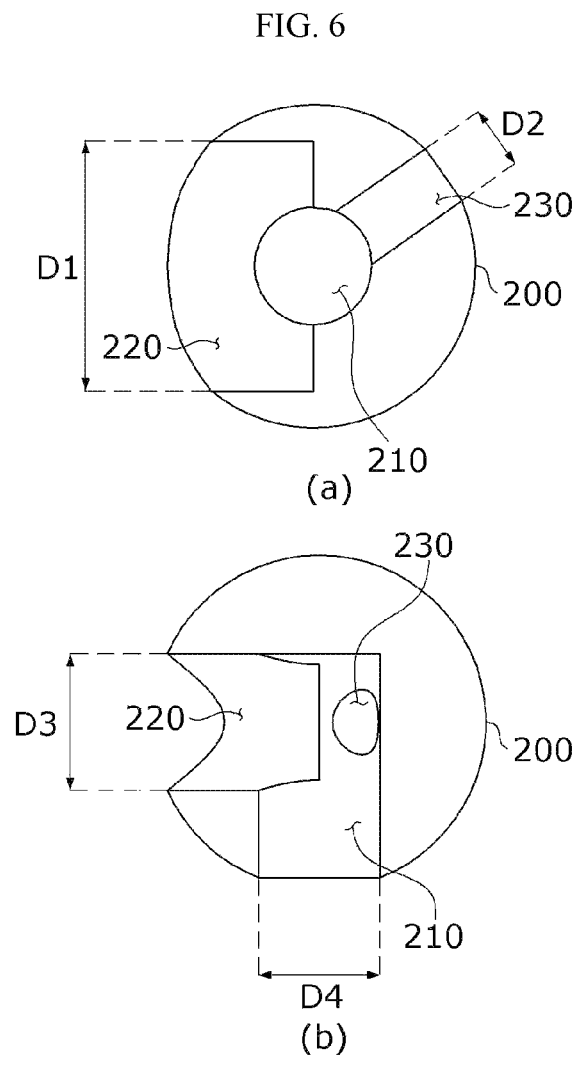

FIG. 2 is a perspective view of a ball valve disposed inside a 3-way valve in accordance with one embodiment of the present invention, FIG. 3 are diagrams illustrating the shape of FIG. 2, FIG. 4 is a cross-sectional view taken along the horizontal direction of FIG. 3, FIG. 5 is a cross-sectional view taken along the vertical direction of FIG. 3, and FIG. 6 are diagrams illustrating the internal structure of FIG. 2. Here, FIG. 3 may be diagrams depicting a ball valve using a set of six-views.

The 3-way valve 1 according to an embodiment of the present invention may include a housing 100 and a ball valve 200.

The housing 100 provides a space in which the ball valve 200 may be disposed, and the piping of the heat pump system 1000 may be connected to the housing. The shape of the housing 100 is not limited in any way and may be changed to a variety of different shapes.

The housing 100 may include an inlet, a first outlet 110, and a second outlet 120.

The inlet (not shown) may be disposed to connect to an inlet hole 210 located in the ball valve 200, the first outlet 110 may be connected to a first outlet hole 220 located in the ball valve 200, and the second outlet 120 may be connected to a second outlet hole 230 located in the ball valve 200.

In one embodiment, the first outlet 110 and the second outlet 120 may be disposed in the housing 100 so as to be opposed to each other. In this case, the inlet may be disposed in a direction perpendicular to the bottom surface of the housing 100, and the centerlines of the first outlet 110 and the second outlet 120 may be disposed orthogonal to the centerline of the inlet.

The ball valve 200 may be disposed within the housing 100 and may rotate in response to the action of the actuator (not shown). The ball valve 200 may include the inlet hole 210 which is connected to the inlet and through which the refrigerant is introduced into the ball valve 200, the first outlet hole 220 through which the refrigerant introduced into the inlet hole 210 flows out, and the second outlet hole 230. When the ball valve 200 is rotated, the refrigerant flowing out of the first outlet hole 220 may be passed through the first outlet 110 and the refrigerant flowing out of the second outlet hole 230 may be discharged through the second outlet 120 so that the flow rate of the refrigerant may be controlled.

The ball valve 200 may be controlled to rotate horizontally within the housing 100. For example, the ball valve 200 may be controlled to rotate with respect to the centerline of the inlet.

The centerline of the first outlet hole 220 and the centerline of the second outlet hole 230 of the ball valve 200 may be arranged to intersect each other. The first outlet hole 220 and the second outlet hole 230 are rotated in the horizontal direction according to the rotation of the ball valve 200 in the horizontal direction. In this case, rotating the first outlet hole 220 and the second outlet hole 230 changes the arrangement of the first outlet hole 220 and the second outlet hole 230 with respect to the first outlet 110 and the second outlet 120 of the housing 100.

The area of the first outlet hole 220 may be formed to be larger than the area of the first outlet 110, and the area of the second outlet hole 230 may be formed to be equal to or smaller than the area of the second outlet 120.

The first outlet hole 220 and the first outlet 110 may be connected to a condenser 1310 in the heat pump system 1000, and the second outlet hole 230 and the second outlet 120 may be connected to a side of an evaporator 1410. In order to regulate the flow rate of the refrigerant passing through the second outlet hole 230 according to the dehumidification status in a vehicle, the area in which the second outlet hole 230 and the second outlet 120 communicate with each other may be configured to be regulated when the ball valve 200 is rotated. In particular, the flow rate of the refrigerant discharged from the second outlet 120 may be increased as the area communicating between the second outlet hole 230 and the second outlet 120 is increased by rotating the ball valve 200.

In this connection, there should be no fluctuation in the flow rate of the refrigerant moving to the first outlet 110, and to achieve this purpose, the area of the first outlet hole 220 may be formed to be larger than the area of the first outlet 110 so that a constant amount of the refrigerant can move through the first outlet hole 220 to the first outlet 110 without fluctuation in the flow rate of the refrigerant.

In one embodiment, the first outlet hole 220 may be formed in an elliptical shape and the second outlet hole 230 may be formed in a circular shape.

(a) of FIG. 6 is a diagram illustrating a horizontal cross section of FIG. 2, and (b) of FIG. 6 is a diagram illustrating a vertical cross section of FIG. 2.

Referring to FIG. 6, a ratio of the transverse diameter D2 of the second outlet hole 230 to the transverse width D1 of the first outlet hole 220 may be formed to be less than or equal to 0.3.

Further, a ratio of the transverse width D1 to the longitudinal height D3 of the first outlet hole 220 may be formed to be greater than 2.

Further, it may be characterized in that the longitudinal height D3 of the first outlet hole 220 and the diameter D4 of the inlet hole 210 are the same.

With the above-mentioned dimensions, when the ball valve 200 is rotated, the flow rate of the refrigerant passing through the first inlet disposed within the housing 100 is always kept constant, while the flow rate of the refrigerant passing through the second inlet may be controlled.

FIGS. 7 through 10 are drawings illustrating the operation of the 3-way valve 1 shown in FIG. 2.

Figure 7:
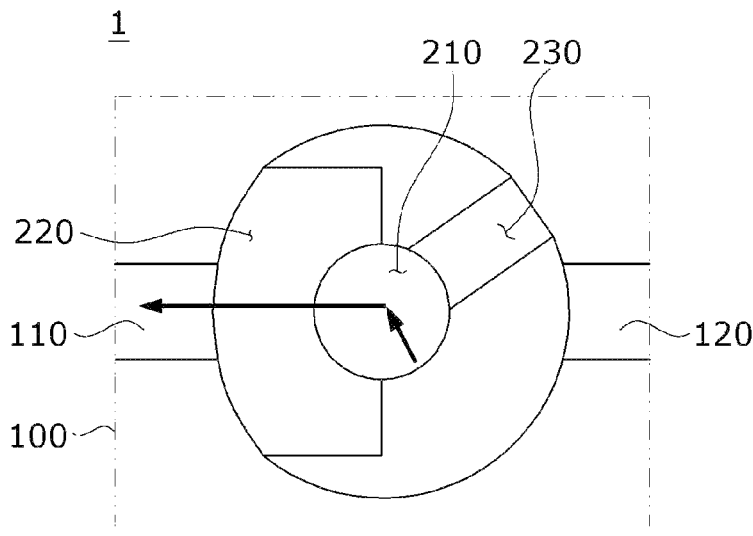
Figure 8:
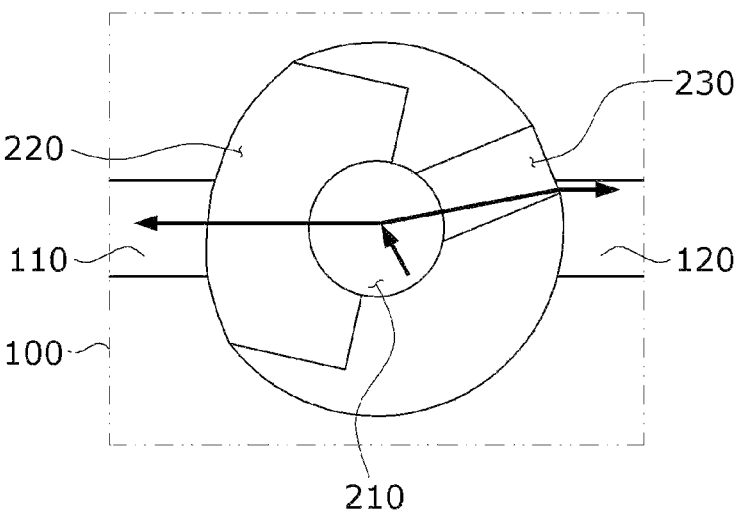
Figure 9:
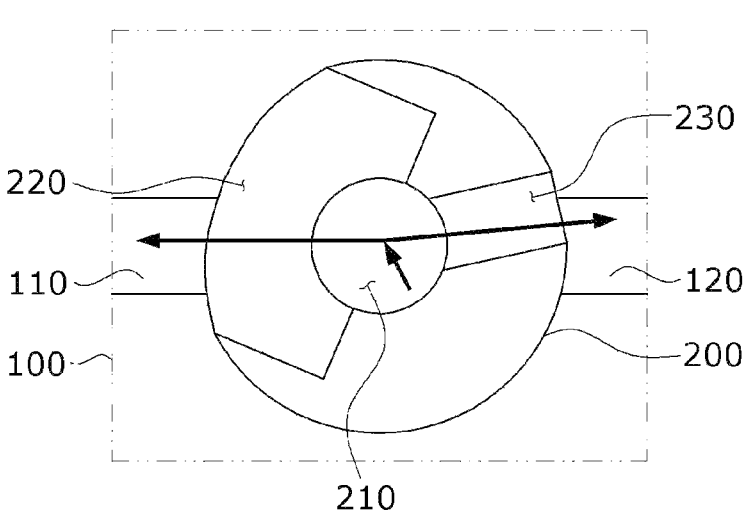
Figure 10:
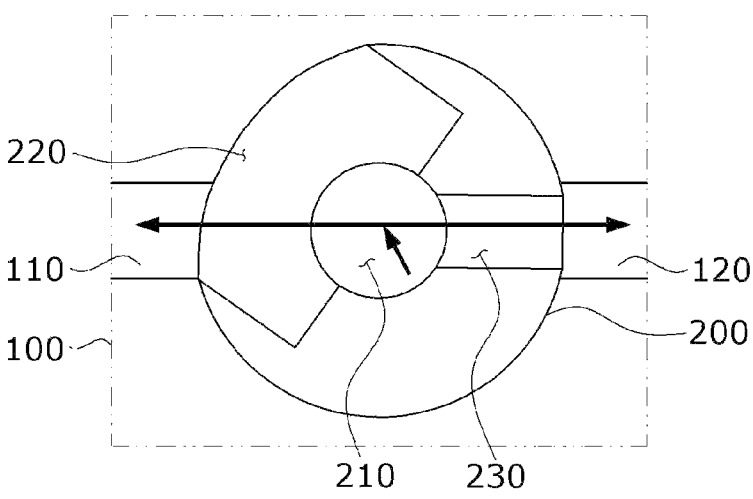
FIG. 10 is a diagram illustrating an internal structure of FIG. 2.

FIG. 7 is a diagram illustrating a configuration in which the second outlet hole 230 is closed, FIG. 8 is a diagram illustrating a configuration in which one-third of the second outlet hole 230 is open, FIG. 9 is a diagram illustrating a configuration in which two-thirds of the second outlet hole 230 is open, and FIG. 10 is a diagram illustrating a configuration in which the second outlet hole 230 is fully open.

Referring to FIG. 7, when a dehumidification mode is not required, the second outlet hole 230 is arranged to be blocked by the inner wall of the housing 100 to prevent the refrigerant from moving, and the first outlet hole 220 is open to allow the refrigerant to move through the first outlet 110.

Referring to FIGS. 8 and 9, when a constant amount of dehumidification is required, a portion of the second outlet hole 230 may be blocked against the inner wall of the housing 100, and the other portion may be in communication with the second outlet 120 to allow the refrigerant to move. The area in which the second outlet hole 230 and the second outlet 120 communicate may be regulated according to the humidity in the vehicle.

Referring to FIG. 10, when maximum dehumidification is required, the entire area of the second outlet hole 230 may communicate with the second outlet 120 to allow the refrigerant to move. In this case, the outermost inner side surface of the first outlet hole 220 may be disposed on the outside of the first outlet 110; and therefore, a constant amount of the refrigerant may continue to move into the first outlet hole 220 even when the refrigerant movement into the second outlet hole 230 is maximized.

Meanwhile, with reference to the accompanying drawings, a heat pump system using a 3-way valve 1 according to another embodiment of the present invention will be described as follows. However, the same as described in the 3-way valve 1 according to one embodiment of the present invention will be omitted.

Figure 11:
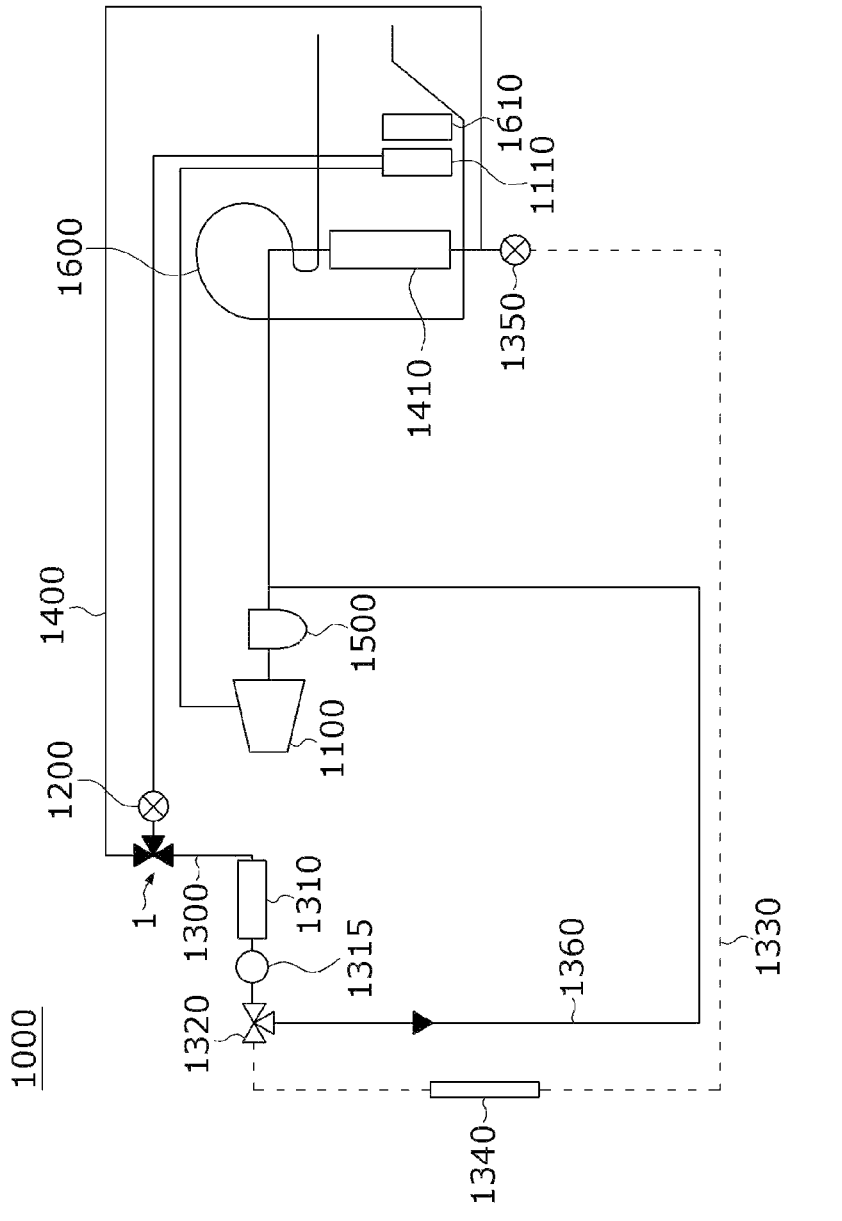
FIG. 11 is a diagram illustrating the construction of a heat pump system using a 3-way valve in accordance with another embodiment of the present invention.

FIG. 11 is a diagram illustrating the configuration of a heat pump system 1000 using a 3-way valve in accordance with another embodiment of the present invention. In the following description of FIG. 11, the same reference numerals as in FIGS. 2 through 10 refer to the same members and are not be described in detail.

Referring to FIG. 11, the heat pump system 1000 in accordance with another embodiment of the present invention may include a compressor 1100, an expansion means, a first moving line 1300, a second moving line 1400, a water-cooled condenser 1310, and an evaporator 1410.

The compressor 1100 is powered by an engine (such as an internal combustion engine), a motor, or the like and is driven to suck in and compress the refrigerant, and then discharge the refrigerant in a gaseous state at a high temperature and pressure.

The refrigerant discharged from the compressor 1100 may introduced into an indoor heat exchanger 1110 disposed within the air conditioning case 1600.

The indoor heat exchanger 1110 may be disposed within the air conditioning case 1600 of the vehicle, and air flowed by a blower (not shown) may be heated as it is passes through the indoor heat exchanger 1110 and supplied to the interior of the vehicle to be used for heating the interior of the vehicle. After passing through the indoor heat exchanger 1110, the refrigerant may be introduced into a first expansion means 1200.

The first expansion means 1200 may be disposed on the outlet side of the compressor 1100 to expand the introduced refrigerant. The refrigerant expanded by the first expansion means 1200 may be branched into and moved to the first moving line 1300 and the second moving line 1400.

Meanwhile, a 3-way valve 1 may be disposed at the bifurcation between the first moving line 1300 and the second moving line 1400.

The 3-way valve 1 may determine the movement direction of the refrigerant to flow when the refrigerant that has been passed through the compressor 1100 is introduced thereto. Meanwhile, the condenser 1310 may be connected to the first moving line 1300 which is connected to the 3-way valve 1, and the evaporator 1410 may be connected to the second moving line 1400 which is connected to the 3-way valve 1.

The 3-way valve 1 may control the amount of the refrigerant introduced into the evaporator 1410 according to humidity information sensed in the vehicle. As noted in one embodiment of the present invention, the 3-way valve 1 may ensure that the refrigerant moving toward the condenser 1310 is always supplied at a constant flow rate, while the refrigerant moving along the second moving line 1400 to the evaporator 1410 has its flow rate controlled according to humidity information, that is, the degree of need for dehumidification.

The condenser 1310 and a receiver dryer 1315 may be disposed on the first moving line 1300.

The condenser 1310 may be capable of condensing the compressed refrigerant. The refrigerant flowing in the condenser 1310 may be moved after heat exchange with a coolant in a coolant circulation line (not shown). The coolant thus heated by the refrigerant in the condenser 1310 may be moved through the coolant circulation line. In one embodiment, a water-cooled condenser may be used as the condenser 1310.

The receiver dryer 1315 may be installed on a refrigerant circulation line, and may not only serve to store the liquid refrigerant but also act as a resistance to the refrigerant flowing through the refrigerant circulation line, thereby increasing the pressure of the refrigerant in the system and thereby improving the heating performance. After passing through the receiver dryer 1315, the refrigerant may be separated at the branch 1320 into a first-first line 1330 and a first-second line 1360, depending on an air conditioning mode.

An air-cooled condenser 1340 and a second expansion means 1350 may be disposed on the first-first line 1330, and the refrigerant moving along the first-second line 1360 may pass through an accumulator 1500 and then be introduced into the compressor 1100.

The refrigerant moving along the first-first line 1330 may be condensed by passing through the air-cooled condenser 1340, expanded by the second expansion means 1350, and then introduced into the evaporator 1410.

The evaporator 1410 may be installed within the air conditioning case, and may be disposed on the refrigerant circulation line to be supplied with the low-temperature, low-pressure refrigerant discharged from the second expansion means 1350, wherein the air flowing within the air conditioning case may be heat-exchanged with the low-temperature, low-pressure refrigerant in the evaporator 1410 and converted into cooled air in a process of forcing the air to pass through the evaporator 1410 by a blower, and then discharged into the interior of the vehicle to cool the interior of the vehicle. The refrigerant that has passed through the evaporator 1410 in this manner may be passed through the accumulator 1500 and then be introduced into the compressor 1100.

The accumulator 1500 may be installed on the refrigerant circulation line at the inlet side of the compressor 1100, and may separate a liquid refrigerant and a gaseous refrigerant from the refrigerant so that only the gaseous refrigerant is supplied to the compressor 1100, and then store the excess refrigerant. A suction port of the compressor 1100 may be connected to a gaseous refrigerant outlet of the accumulator 1500, which may prevent the liquid refrigerant drawn into the compressor 1100.

With reference to FIG. 11, the operation of the heat pump system 1000 in the heating and dehumidification mode will be described.

The compressor 1100 on the refrigerant circulation line operates, and a high-temperature and high-pressure refrigerant is discharged from the compressor 1100. The discharged refrigerant is introduced into the first expansion means 1200 through the indoor heat exchanger 1110 disposed inside the air conditioning case 1600, wherein the direction of movement of the refrigerant is determined by the 3-way valve 1.

When it is determined that dehumidification is not required in the vehicle, the refrigerant introduced into the 3-way valve 1 is moved to the first moving line 1300, while the movement of the refrigerant to the second moving line 1400 is blocked.

When it is determined that dehumidification is required based on humidity information in the vehicle, the 3-way valve 1 may rotate the ball valve 200 disposed in the 3-way valve 1 to direct the refrigerant into the first moving line 1300 and the second moving line 1400.

In this situation, the 3-way valve 1 may regulate the flow rate of the refrigerant passing through the ball valve 200 and flowing into the second moving line 1400 according to the required degree of dehumidification. The refrigerant moving along the second moving line 1400 may pass through the evaporator 1410, where it may be heat exchanged with air blown by a blower (not shown) inside the air conditioning case 1600 to remove moisture from the air.

The refrigerant moving to the first moving line 1300 may pass through the water-cooled condenser 1310 and the receiver dryer 1315, and then move along the first-two lines 1360 at the branch 1320 before being passed through the accumulator 1500 and introduced into the compressor 1100.

The embodiment of the present invention has been specifically described above with reference to the accompanying drawings.

The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

EXPLANATION OF REFERENCE NUMERALS

1: 3-way valve, 100: housing, 110: first outlet, 120: second outlet, 200: ball valve, 210: inlet hole, 220: first outlet, 230: second outlet, 1000: heat pump system, 1100: compressor, 1110: indoor heat exchanger, 1200: first expansion means, 1300; first moving line, 1310: condenser, 1315: receiver dryer, 1320: branch, 1330: first-first line, 1340: air cooled condenser, 1350: second expansion means, 1360: first-second line, 1400: second moving line, 1410: evaporator, 1500: accumulator, 1600: air conditioning case

What is claimed is:

1. A 3-way valve comprising:
a housing having an inlet, a first outlet, and a second outlet disposed therein; and
a ball valve disposed within the housing,
wherein the ball valve includes an inlet hole which is connected to the inlet and into which a refrigerant is introduced, and a first outlet hole and a second outlet hole through which the refrigerant introduced into the inlet hole flows out,
wherein when the ball valve is rotated, the refrigerant flowing out through the first outlet hole passes through the first outlet, and the refrigerant flowing out through the second outlet hole passes through the second outlet,
wherein the flow rate of the refrigerant discharged from the first outlet and the second outlet is controlled depending on the position of the first outlet hole and the second outlet hole due to the rotation of the ball valve,
wherein the first outlet and the second outlet are disposed in the housing so as to be opposed each other,
wherein the centerline of the first outlet hole and the centerline of the second outlet hole are arranged to intersect each other, and
wherein an area of the first outlet hole is formed to be larger than an area of the first outlet, and an area of the second outlet hole is formed to be equal to or smaller than an area of the second outlet.

2. The 3-way valve according to claim 1, wherein a ratio of a transverse diameter of the second outlet hole to a transverse width of the first outlet hole is less than or equal to 0.3.

3. The 3-way valve according to claim 1, wherein a ratio of a transverse width to a longitudinal height of the first outlet hole is greater than 2.

4. The 3-way valve according to claim 3, wherein a longitudinal height of the first outlet hole and a diameter of the inlet hole are the same.

5. The 3-way valve according to claim 1, wherein when the second outlet hole is blocked by the inner wall of the housing due to the rotation of the ball valve, all of the refrigerant introduced through the inlet is discharged from the first outlet through the first outlet hole.

6. The 3-way valve according to claim 1, wherein the flow rate of the refrigerant discharged from the first outlet and the second outlet is controlled by regulating the area in which the second outlet hole and the second outlet communicate with each other by rotating the ball valve.

7. The 3-way valve according to claim 6, wherein the flow rate of the refrigerant discharged from the second outlet is increased as the area communicating between the second outlet and the second outlet hole is increased by rotating the ball valve.

8. The 3-way valve according to claim 1, wherein the area of the first outlet hole is formed to be larger than the area of the first outlet so that the area communicating between the first outlet hole and the first outlet remains constant even when the ball valve is rotated.

9. A heat pump system comprising:
a compressor configured to compress and discharge a refrigerant;
a first expansion valve configured to expand a compressed refrigerant;
a first moving line and a second moving line along which the refrigerant expanded by the first expansion valve moves;
a condenser disposed on the first moving line; and
an evaporator into which the refrigerant moving along the second moving line is introduced, the evaporator being disposed within an air conditioning case,
wherein the 3-way valve in any one of claims 1 and 2 to 8 is disposed at a bifurcation of the first moving line and the second moving line.

10. The heat pump system according to claim 9, wherein the refrigerant which has passed through the compressor passes through an indoor heat exchanger disposed within the air conditioning case and is then introduced into the first expansion valve.

11. The heat pump system according to claim 10, wherein in a heating and dehumidification mode, the 3-way valve is configured to control the amount of the refrigerant introduced into the evaporator according to humidity information sensed in a vehicle.

12. The heat pump system according to claim 9, wherein the second moving line is connected to the evaporator by bypassing a second expansion valve.

* * * * *